United States Patent [19]

Nogami et al.

[11] Patent Number: 4,617,243
[45] Date of Patent: Oct. 14, 1986

[54] ELECTROCHEMICAL BATTERY

[75] Inventors: Takashi Nogami, Toyonaka; Masayoshi Nawa, Minoo, both of Japan

[73] Assignee: Kao Soap Co., Ltd., Tokyo, Japan

[21] Appl. No.: 397,238

[22] Filed: Jul. 12, 1982

[30] Foreign Application Priority Data

Aug. 27, 1981 [JP] Japan ................. 56-134690

[51] Int. Cl.$^4$ ............................................. H01M 6/14
[52] U.S. Cl. ..................................... 429/194; 429/218
[58] Field of Search ........................ 429/194, 213, 218

[56] References Cited

U.S. PATENT DOCUMENTS

| | | | |
|---|---|---|---|
| 3,870,565 | 3/1975 | Bonnemay et al. | 429/40 X |
| 4,271,242 | 6/1981 | Toyoguchi | 429/194 |
| 4,321,114 | 3/1982 | MacDiarmid et al. | 429/213 X |
| 4,327,166 | 4/1982 | Leger | 429/194 |
| 4,333,996 | 6/1982 | Louzos | 429/213 X |
| 4,366,216 | 12/1982 | McGinness | 429/213 |
| 4,375,427 | 3/1983 | Miller et al. | 429/213 X |

Primary Examiner—Charles F. LeFevour
Attorney, Agent, or Firm—Oblon, Fisher, Spivak, McClelland & Maier

[57] ABSTRACT

Disclosed herein is an electrochemical battery having electrodes immersed in an organic solvent electrolyte solution so that the electromotive force is generated by doping to and/or undoping from said electrodes. Both electrodes are characterized to be carbon molded products having a specific surface area of 100 to 2500 m$^2$/g. The electrodes according to this invention are capable of accepting a large quantity of doping, light in weight and easy to handle.

5 Claims, No Drawings

ELECTROCHEMICAL BATTERY

BACKGROUND OF THE INVENTION

1. Field of the Invention

The present invention relates to an electrochemical battery that employs an organic solvent. More particularly, it relates to a battery in which carbon products having a specific surface area of 100 to 2500 $m^2/g$ (referred to as "active carbon products" hereinafter) are used as the electrodes.

2. Description of the Prior Art

As the energy problem became an important issue recently, there has occurred a strong demand for a battery of new type which has high energy density ahd light weight.

There is reported a study similar to this invention in which the battery is formed by using polyacetylene for the electrode. Such a battery, however, is disadvantageous in that polyacetylene is unstable, difficult to produce even in a laboratory, and hence not industrially available.

SUMMARY OF THE INVENTION

In order to develop a high-power and lightweight battery using electrodes which are stable and readily available industrially, the present inventors carried out extensive studies, which led to the findings that the objective can be achieved by using carbon products of special structure as the electrode. The present invention is based on these findings.

According to the present invention, the electrodes are made of a carbon material of special structure, particularly active carbon molded product. The electrodes are immersed in an electrolyte solution, and a voltage is applied externally to the electrodes so that the carbon material of both electrodes are doped to produce the P-type material and N-type material, respectively. After that, discharge is effected and the electromotive force which occurs in the course of discharge is utilized as the output of the battery. Also, according to this invention, the electromotive force that occurs when the active carbon product is doped with a simple metallic substance as an counter electrode is utilized as the output of the battery.

Thus, this invention resides in an electrochemical battery having electrodes immersed in an organic solvent solution in which one or more electrolyte may be dissolved so that the electromotive force is generated by doping to and/or undoping from said electrodes, characterized in that both electrodes are carbon molded products having a specific surface area of 100 to 2500 $m^2/g$.

DETAILED DESCRIPTION OF PREFERRED EMBODIMENTS

The electrolyte used in this invention, is known electrolytes such as tetraalkylammonium salts (with counter anions being perchlorate ion, hexaflurophosphorus ion, hexafluorothallium ion, hexafluoroarsenic ion, hexafluoroantimony ion, halogen ion, nitrate ion, sulfate ion, tetraoxyrhenium ion, etc.), and alkali metal salts and alkaline earth metal salts (with counter anions being as listed above).

The solvent used in this invention includes dimethylsulfoxide, acetonitrile, propylene carbonate, 4-butyrolactone, formamide, dimethylformamide, methylformamide, tetrahydrofuran, 1,2-dimethoxyethane, etc. and other organic solvents which are generally used for batteries. Organic solvents are used because they provide a higher electrolytic voltage than water, and they, unlike water, do not cause damage to the apparatus when leakage occurs.

According to this invention, both electrodes are active carbon products of such a structure that the specific surface area is 100 to 2500 $m^2/g$. The active carbon products may be prepared by known methods, granular or powdery activated carbon to be formed into rod, string, or sheet in such a manner that provides a specific surface area of 100 to 2500 $m^2/g$. The active carbon products may also be carbon fibers having a specific surface area of 100 to 2500 $m^2/g$. Preferable active carbon product is one in the form of string or sheet made of carbon fibers having a diameter of 10 to 20 $\mu$m. The sheet may be in the form of felt, paper, or honeycomb. A remarkable effect is produced with a sheet of carbon fiber having a myriad of fine pores about 10 Å in diameter and a specific surface area of 300 to 2000 $m^2/g$ (referred to as active carbon fiber hereinafter). This carbon fiber has the fibril structure and an extremely large surface area, so that it can be doped with a large amount of impurities by electrochemical means.

The batteries for which the doping technique is used are divided into two broad categories. One category embraces the battery of this invention, which is of such a structure that two electrodes of active carbon product are immersed in the electrolyte solution. The battery is charged with a voltage externally applied for a certain period of time, and then allowed to afford the electromotive force as the impurities doped in the electrodes are dissolved in the solution in the discharge cycle. The other category includes the battery of such a structure that a simple metallic substance is used as the counter electrode for the electrode of active carbon molded product, and the electromotive force of the battery is generated when the metal dissolves in the solution and the metal ion is doped in the active carbon molded product. The former category is further divided into two groups. In one group, the P-type electrode and N-type electrode formed by charging are used as the two electrodes of the battery. In the other group, P-type electrodes of different doping quantity or N-type electrodes of different doping quantity are used as the paired electrodes so that a concentration cell is formed.

The electrodes of active carbon products according to this invention have the following advantages.

1. Readily available.
2. Chemically stable.
3. Available in various forms—felt, paper, and honeycomb—that meet the requirements for battery design.
4. Capable of accepting a large quantity of doping.
5. Capable of being doped with impurities of both P-type and N-type.
6. Having high electrical conductivity required for electrode material.
7. Light in weight and easy to handle.

The fourth advantage is most important in this invention. According to this invention, electrodes of simple metallic substance are not used because such electrodes form dendroid objects thereon and eventually fall off after repetition of charging and discharging cycles. The active carbon products used in this invention has a specific surface area of 100 to 2500 $m^2/g$ as mentioned above, and therefore, it accepts a large quantity of doping electrochemically and provides an output of high energy. Since the active carbon products can be doped either in P-type and N-type, it is suitable for the secondary battery which is used repeatedly by charging. The seventh advantage has made it possible to develop a lightweight battery of high energy density.

The invention is described in detail with reference to the following examples.

EXAMPLE 1

Two sheets of KF paper, P-175 (1 cm by 1 cm, weighing about 7 mg) made of active carbon fiber (Toyobo Co., Ltd.) were immersed in a propylene carbonate solution of 0.3M lithium perchlorate at room temperature, each connected to the external power source by a alligator clips, and a constant current of 1 mA was applied for 1 hour. The open circuit voltage (Voc) was 1.4 V and the short circuit current (Isc) was 2 mA, when measured with an electrometer (made by Takede Riken, Model TR8651).

EXAMPLE 2

Example 1 was repeated except that the solvent was replaced by tetrahydrofuran. Voc was 1.4 V and Isc was 0.9 mA.

EXAMPLE 3

Example 1 was repeated except that the solvent was replaced by tetrahydrofuran and the electrolyte was replaced by 0.3M tetrabutylammonium perchlorate. Voc was 2.15 V and Isc was 1.2 mA.

EXAMPLE 4

Example 1 was repeated except that the electrolyte was replaced by 0.3M tetrabutylammonium perchlorate. Voc was 1.92 V and Isc was 3.1 mA.

EXAMPLE 5

Example 1 was repeated except that the electrolyte was replaced by 0.5M tetrabutylammonium perchlorate. Voc was 1.92 V and Isc was 3.5 mA.

EXAMPLE 6

Example 1 was repeated except that the electrolyte was replaced by 0.17M tetramethylammonium hexafluorophosphate. Voc was 2.45 V and Isc was 3.0 mA.

EXAMPLE 7

Example 1 was repeated except that the electrolyte was replaced by 0.15M potassium iodide. Voc was 1.53 V and Isc was 1.2 mA.

EXAMPLE 8

Experiments were carried out using the same setup as in Example 5. In one experiment, charging was performed for 1 hour, and in the other, 5 minutes. Thus two sheets of active carbon fiber, which are different in the doped quantity of perchlorate ion, were obtained from the anode; and two sheets of active carbon fiber, which are different in the doped quantity of tetrabutylammonium ion, were obtained from the cathode. The former two electrodes were immersed in a propylene carbonate solution of 0.5M tetrabutylammonium perchlorate. Voc was 0.38 V and Isc was 2.0 $\mu$A.

EXAMPLE 9

The electrodes of active carbon fiber obtained from the cathode in Example 8 were immersed in propylene carbonate solution of 0.5M tetrabutylammonium perchlorate. Voc was 0.04 V and Isc was 60 $\mu$A.

EXAMPLE 10

Two sheets of KF felt, F-1600 (1.5 cm by 1.5 cm, weighing about 40 mg) made of active carbon fiber (Toyobo Co., Ltd.) were immersed in a propylene carbonate solution of 0.5M lithium perchlorate at room temperature, and charging was performed with a constant voltage of 3 V for 30 minutes. Voc was 2.9 V and Isc was 28 mA.

What is claimed is:

1. An electrochemical cell capable of generating an electromotive force, comprising:
   a cathode-type electrode;
   an anode-type electrode; and
   an organic solvent;
   wherein said cathode-type electrode comprises a first activated elemental carbon part doped with a cationic electrolyte species, and said anode-type electrode comprises a second activated elemental carbon part doped with an anionic electrolyte species; said first and second carbon part having a specific surface area of 100–2,500 $m^2/g$; whereby by immersing said electrodes in the solvent, said dopants are dissolved out of said solvent.

2. The cell of claim 1, wherein the specific surface area of the first and second carbon parts is 300–2,000 $m^2/g$.

3. An electrochemical cell capable of generating an electromotive force, comprising:
   a first and second electrodes, and
   an organic solvent, wherein said first and second electrodes comprise a first and second activated elemental carbon parts doped with different amounts of the same cationic electrolyte species; said first and second carbon parts having a specific surface area of 100–2500 $m^2/g$, whereby the concentrations of said dopant at the points of contact of said first and second electrodes with said solvent are different.

4. The cell of claim 3, wherein the first and second carbon electrodes are doped with different amounts of the same anionic electrolyte species.

5. The cell of claim 1, wherein said electrodes are formed by immersion of said first and second activated carbon parts in an electrolyte composition of the cationic and the anionic species dissolved in a second organic solvent, and applying an external voltage across said elements.

* * * * *